(12) United States Patent
Lutoslawski

(10) Patent No.: US 8,235,853 B2
(45) Date of Patent: Aug. 7, 2012

(54) HYBRID TRANSMISSIONS WITH PLANETARY GEARSETS

(75) Inventor: Jaroslaw Lutoslawski, Mississauga (CA)

(73) Assignee: Magna Powertrain Inc., Concord (CA)

( * ) Notice: Subject to any disclaimer, the term of this patent is extended or adjusted under 35 U.S.C. 154(b) by 576 days.

(21) Appl. No.: 12/445,597

(22) PCT Filed: Oct. 9, 2007

(86) PCT No.: PCT/CA2007/001766
§ 371 (c)(1),
(2), (4) Date: Apr. 15, 2009

(87) PCT Pub. No.: WO2008/046185
PCT Pub. Date: Apr. 24, 2008

(65) Prior Publication Data
US 2010/0216584 A1    Aug. 26, 2010

Related U.S. Application Data

(60) Provisional application No. 60/852,708, filed on Oct. 18, 2006.

(51) Int. Cl.
*F16H 3/72* (2006.01)
(52) U.S. Cl. .............................. 475/5; 74/335
(58) Field of Classification Search .............. 475/5, 209, 475/219; 74/335, 339
See application file for complete search history.

(56) References Cited

U.S. PATENT DOCUMENTS

| | | | | |
|---|---|---|---|---|
| 3,979,972 A * | 9/1976 | Sakai et al. | ..................... | 475/81 |
| 4,368,650 A | 1/1983 | Numazawa et al. | | |
| 4,774,856 A * | 10/1988 | Hiraiwa | ........................ | 475/285 |
| 5,730,676 A * | 3/1998 | Schmidt | ............................ | 475/5 |
| 5,935,035 A * | 8/1999 | Schmidt | ............................ | 475/5 |
| 5,971,883 A * | 10/1999 | Klemen | ........................ | 475/296 |
| 6,159,127 A | 12/2000 | Loeffler et al. | | |
| 6,190,280 B1 * | 2/2001 | Horsch | ........................ | 475/209 |
| 6,428,438 B1 * | 8/2002 | Bowen | ............................. | 475/5 |
| 6,478,705 B1 * | 11/2002 | Holmes et al. | ..................... | 475/5 |
| 6,502,652 B2 * | 1/2003 | Rogg | ........................... | 180/65.21 |
| 6,508,738 B2 * | 1/2003 | Kima | ............................ | 475/312 |
| 6,551,208 B1 * | 4/2003 | Holmes et al. | ..................... | 475/5 |
| 6,558,283 B1 * | 5/2003 | Schnelle | ........................... | 475/5 |
| 6,575,866 B2 * | 6/2003 | Bowen | ............................. | 475/5 |
| 6,579,201 B2 * | 6/2003 | Bowen | ............................. | 475/5 |

(Continued)

FOREIGN PATENT DOCUMENTS

EP     0622262 B1     11/1994

(Continued)

*Primary Examiner* — John R Olszewski
*Assistant Examiner* — Brodie Follman
(74) *Attorney, Agent, or Firm* — Harness, Dickey & Pierce, P.L.C.

(57) ABSTRACT

A transmission for use in a motor vehicle having an engine and a driveline is provided. The transmission includes an input shaft driven by the engine, an output shaft adapted for connection to the driveline, a mainshaft, a first planetary gearset, a motor/generator and a second planetary gearset. The first planetary gearset includes a first input member driven by the input shaft, a first output member driving the mainshaft and a first reaction member. The second planetary gearset includes a second input member, a second output member fixed to the output shaft and a ring gear operable to drive or be driven by the motor/generator. A rotor of the motor/generator circumscribes and is fixed to the ring gear.

20 Claims, 6 Drawing Sheets

U.S. PATENT DOCUMENTS

| | | | |
|---|---|---|---|
| 6,634,986 B2* | 10/2003 | Kima | 477/107 |
| 6,645,105 B2* | 11/2003 | Kima | 475/5 |
| 6,655,485 B1 | 12/2003 | Ito et al. | |
| 6,716,126 B2* | 4/2004 | Bowen | 475/5 |
| 6,766,705 B1* | 7/2004 | Hall, III | 74/331 |
| 6,793,600 B2* | 9/2004 | Hiraiwa | 475/5 |
| 6,811,508 B2* | 11/2004 | Tumback | 475/5 |
| 6,827,165 B2* | 12/2004 | Schmidt | 180/65.235 |
| 6,937,931 B2* | 8/2005 | Funato et al. | 701/54 |
| 6,945,894 B2* | 9/2005 | Holmes | 475/5 |
| 6,953,409 B2* | 10/2005 | Schmidt et al. | 475/5 |
| 6,966,860 B2 | 11/2005 | Heitmann et al. | |
| 7,074,149 B2* | 7/2006 | Morimoto | 475/83 |
| 7,137,919 B2* | 11/2006 | Holmes | 475/5 |
| 7,166,050 B2* | 1/2007 | Schmidt et al. | 475/5 |
| 7,172,525 B2* | 2/2007 | Sowul et al. | 475/5 |
| 7,264,071 B2* | 9/2007 | Schmidt et al. | 180/65.6 |
| 7,276,007 B2* | 10/2007 | Takami et al. | 475/5 |
| 7,361,111 B2* | 4/2008 | Aitzetmueller et al. | 475/83 |
| 7,371,201 B2* | 5/2008 | Usoro | 475/5 |
| 7,427,252 B2* | 9/2008 | Holmes | 475/5 |
| 7,429,228 B2* | 9/2008 | Hiraiwa | 475/219 |
| 7,455,610 B2* | 11/2008 | Kim | 475/5 |
| 7,462,121 B2* | 12/2008 | Janson et al. | 475/5 |
| 7,478,690 B2* | 1/2009 | Kim | 180/65.25 |
| 7,479,080 B2* | 1/2009 | Usoro | 475/5 |
| 7,479,081 B2* | 1/2009 | Holmes | 475/5 |
| 7,572,201 B2* | 8/2009 | Supina et al. | 475/5 |
| 7,575,529 B2* | 8/2009 | Holmes | 475/5 |
| 7,632,202 B2* | 12/2009 | Supina et al. | 475/5 |
| 7,704,176 B2* | 4/2010 | Holmes | 475/5 |
| 7,927,244 B2* | 4/2011 | Iwanaka et al. | 475/5 |
| 7,980,980 B2* | 7/2011 | Rask et al. | 475/5 |
| 7,988,579 B2* | 8/2011 | Tabata et al. | 475/5 |
| 8,066,609 B2* | 11/2011 | Kersting | 475/282 |
| 8,075,436 B2* | 12/2011 | Bachmann | 475/5 |
| 2001/0019980 A1 | 9/2001 | Kanehisa | |
| 2002/0045507 A1* | 4/2002 | Bowen | 475/5 |
| 2002/0088291 A1* | 7/2002 | Bowen | 74/339 |
| 2002/0117860 A1 | 8/2002 | Man et al. | |
| 2003/0045389 A1* | 3/2003 | Kima | 475/5 |
| 2003/0078126 A1* | 4/2003 | Holmes et al. | 475/5 |
| 2003/0199353 A1* | 10/2003 | Bowen | 475/5 |
| 2004/0168841 A1* | 9/2004 | Ohta et al. | 180/65.2 |
| 2004/0254039 A1* | 12/2004 | Yasui et al. | 475/5 |
| 2005/0107199 A1 | 5/2005 | Minagawa | |
| 2005/0221939 A1* | 10/2005 | Takami et al. | 475/5 |
| 2005/0252703 A1* | 11/2005 | Schmidt et al. | 180/65.2 |
| 2006/0019784 A1* | 1/2006 | Sowul et al. | 475/5 |
| 2006/0032321 A1* | 2/2006 | Aitzetmueller et al. | 74/330 |
| 2006/0052199 A1* | 3/2006 | Singh et al. | 475/5 |
| 2006/0058146 A1* | 3/2006 | Brissenden et al. | 475/198 |
| 2006/0105876 A1* | 5/2006 | Holmes | 475/5 |
| 2006/0148606 A1* | 7/2006 | Bucknor et al. | 475/5 |
| 2006/0169506 A1* | 8/2006 | Handa et al. | 180/65.5 |
| 2006/0276288 A1* | 12/2006 | Iwanaka et al. | 475/5 |
| 2007/0219035 A1* | 9/2007 | Raghavan et al. | 475/5 |
| 2007/0225108 A1* | 9/2007 | Kamm et al. | 475/275 |
| 2007/0232437 A1* | 10/2007 | Kamm et al. | 475/275 |
| 2007/0243966 A1* | 10/2007 | Holmes et al. | 475/5 |
| 2007/0254762 A1* | 11/2007 | Chachra et al. | 475/5 |
| 2007/0265126 A1* | 11/2007 | Janson et al. | 475/5 |
| 2008/0009380 A1* | 1/2008 | Iwanaka et al. | 475/5 |
| 2008/0039258 A1* | 2/2008 | Usoro | 475/5 |
| 2008/0045365 A1* | 2/2008 | Usoro | 475/5 |
| 2008/0078591 A1* | 4/2008 | Schondorf et al. | 180/65.2 |
| 2008/0127758 A1* | 6/2008 | Gitt | 74/329 |
| 2008/0141808 A1* | 6/2008 | Gumpoltsberger | 74/340 |
| 2008/0182694 A1* | 7/2008 | Holmes | 475/5 |
| 2008/0227592 A1* | 9/2008 | Steffen et al. | 477/19 |
| 2008/0254932 A1* | 10/2008 | Heinzelmann | 475/269 |
| 2009/0105028 A1* | 4/2009 | Hiraki et al. | 475/78 |

FOREIGN PATENT DOCUMENTS

| | | |
|---|---|---|
| EP | 0780256 A2 | 6/1997 |
| WO | WO/2006/029878 | 3/2006 |

* cited by examiner

HYBRID TRANSMISSIONS WITH PLANETARY GEARSETS

FIELD

The present invention relates generally to transmissions for use in motor vehicles and, more particularly, to a hybrid transmission applicable for use in two-wheel drive or all-wheel drive vehicles.

BACKGROUND

Automobile manufacturers continuously strive to improve fuel efficiency. This effort to improve fuel efficiency, however, is typically offset by the need to provide enhanced comfort and convenience to the vehicle operator. For example, it is well known that manual transmissions are more fuel efficient than automatic transmissions, yet a majority of all passenger vehicles are equipped with automatic transmissions due to the increased convenience they provide.

More recently, "automated" variants of conventional manual transmissions have been developed which shift automatically without any input from the vehicle operator. Such automated transmissions typically include a plurality of power-operated actuators that are controlled by a transmission controller to shift traditional synchronized dog clutches. However, such automated transmissions have the disadvantage that there is a power interruption in the drive connection between the input shaft and the output shaft during sequential gear shifting. Power interrupted shifting results in a harsh shift feel which is generally considered to be unacceptable when compared to the smooth shift feel associated with most automatic transmissions. To overcome this problem, automated twin-clutch transmissions have been developed which can be powershifted to permit gearshifts to be made under load. Examples of such automated manual transmissions are shown in U.S. Pat. Nos. 5,966,989 and 5,890,392. While such powershift twin-clutch transmissions overcome several drawbacks associated with conventional single-clutch automated transmissions, a need exists to develop simpler and more robust transmissions which advance the automotive transmission technology.

Automobile manufacturers are also actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles are equipped with an internal combustion engine and an electric motor that can be operated independently or in combination to drive the vehicle.

There are two types of hybrid vehicles, namely series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

SUMMARY

The present disclosure provides a transmission for use in a motor vehicle having an engine and a driveline. The transmission includes an input shaft driven by the engine, an output shaft adapted for connection to the driveline, a mainshaft, a first planetary gearset, a motor/generator and a second planetary gearset. The first planetary gearset includes a first input member driven by the input shaft, a first output member driving the mainshaft and a first reaction member. The second planetary gearset includes a second input member, a second output member fixed to the output shaft and a ring gear operable to drive or be driven by the motor/generator. A rotor of the motor/generator circumscribes and is fixed to the ring gear.

In another configuration, a transmission for use in a motor vehicle having an engine and driveline includes an input shaft driven by the engine, an output shaft adapted for connection to the driveline, a mainshaft, a first planetary gearset, a motor/generator, a second planetary gearset, a first clutch and a second clutch. The first planetary gearset has a first input member driven by the input shaft, a first output member driving the mainshaft and a first reaction member. The second planetary gearset has a second input member driven by the input shaft, a second output member driving the output shaft and a reaction member operable to drive or be driven by the motor/generator. The first clutch is operable for releasably braking the first reaction member. The second clutch is operable for releasably coupling the first reaction member and the first output member to establish a drive connection between the first reaction member and the first output member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
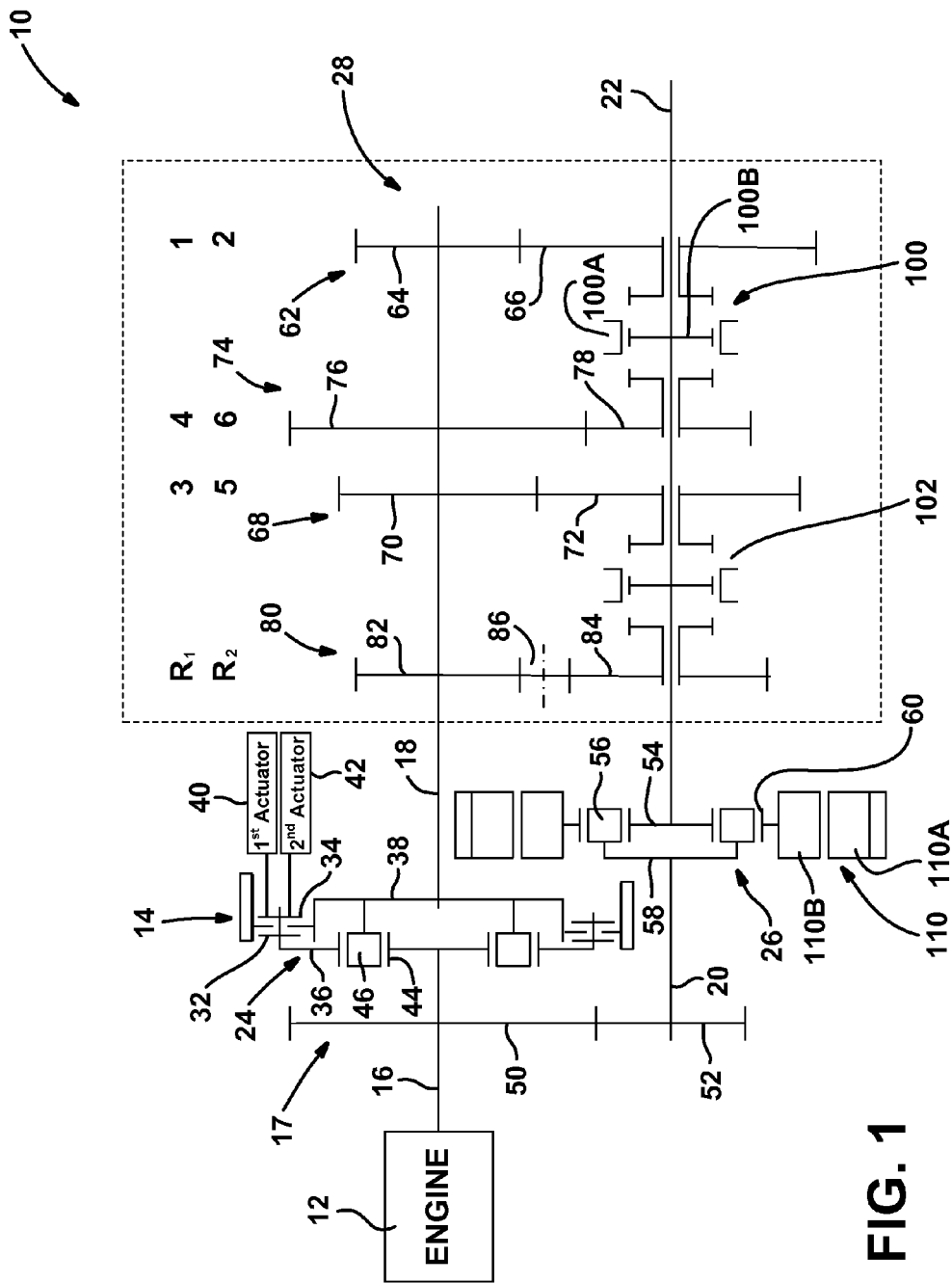
FIG. 1 is a schematic view of a hybrid automated transmission according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1, a hybrid automated transmission 10 is driven by the output of an engine 12 and generally includes a double clutch 14, an input shaft 16, an input gearset 17, a mainshaft 18, a countershaft 20, an output shaft 22, a first planetary gearset 24, a second planetary gearset 26, output gearsets 28 and a shift control system 30.

Double clutch 14 is a wet clutch having a first clutch 32 and a second clutch 34 packaged in combination with one another. First clutch 32 is operable to selectively brake a ring gear 36 of first planetary gearset 24. Second clutch 34 is selectively operable to couple ring gear 36 to a carrier 38 to establish a direct drive connection between input shaft 16 and mainshaft 18. A first actuator 40 is provided to control first clutch 32 and allow a varying magnitude of torque to be transferred through first clutch 32. In similar fashion, a second actuator 42 is operable to control second clutch 34. Preferably, actuators 40 and 42 are electrically-actuated devices such as electromagnetic solenoids. Each of the actuators are operable to control the relative position of components within first clutch 32 and second clutch 34 and thus independently control the magnitude of the torque transmitted through first clutch 32 and second clutch 34.

First planetary gearset 24 includes a sun gear 44 fixed on input shaft 16, a plurality of planet gears 46 rotatably mounted on carrier 38 and ring gear 36. Planet gears 46 are in meshed engagement with sun gear 44 and ring gear 36. Carrier 38 is fixed to mainshaft 18.

Input gearset 17 provides a split torque path from engine 12 and input shaft 16. Input gearset 17 includes a first input gear 50 fixed to input shaft 16 which is meshed with a first transfer gear 52 fixed to countershaft 20. Accordingly, a fixed ratio drive connection is provided between input shaft 16 and countershaft 20.

Second planetary gearset 26 includes a sun gear 54 fixed to output shaft 22 and a plurality of pinion gears 56 rotatably supported on a carrier 58. Carrier 58 is fixed to countershaft 20. Second planetary gearset 26 also includes a ring gear 60. Pinion gears 56 are in meshing engagement with sun gear 54 and ring gear 60.

Output gearsets 28 includes a plurality of constant-mesh gearsets supported on mainshaft 18 and output shaft 22. Specifically, output gearsets 28 include four gear sets arranged to establish six forward drive ratios and two reverse drive ratios. A first output gearset 62 includes a first speed gear 64 fixed to mainshaft 18 which is meshed with a first drive gear 66 rotatably supported on output shaft 22. A second output gearset 68 includes a second speed gear 70 fixed to mainshaft 18 which is meshed with a second drive gear 72 rotatably supported on output shaft 22. A third output gearset 74 includes a third speed gear 76 fixed to mainshaft 18 in meshing engagement with a third drive gear 78 rotatably supported on output shaft 22. A fourth output gearset 80 includes a reverse speed gear 82 fixed to mainshaft 18, a reverse drive gear 84 rotatably supported on output shaft 22 and a reverse idler gear 86 meshed with reverse speed gear 82 and reverse drive gear 84.

First output gearset 62 is arranged to provide a first drive ratio when first clutch 32 of double clutch 14 is engaged. First output gearset 62 also transfers torque to provide a second drive ratio when second clutch 34 transfers torque and first clutch 32 does not. Similarly, second output gearset 68 may provide a third and a fourth drive ratio depending on the actuation state of first clutch 32 and second clutch 34. Third output gearset 74 is arranged to provide fifth and sixth forward drive ratios. Fourth output gearset 80 provides two reverse drive ratios. The specific drive ratio obtained is determined by the actuation condition of first clutch 32 and second clutch 34.

Figure 2:
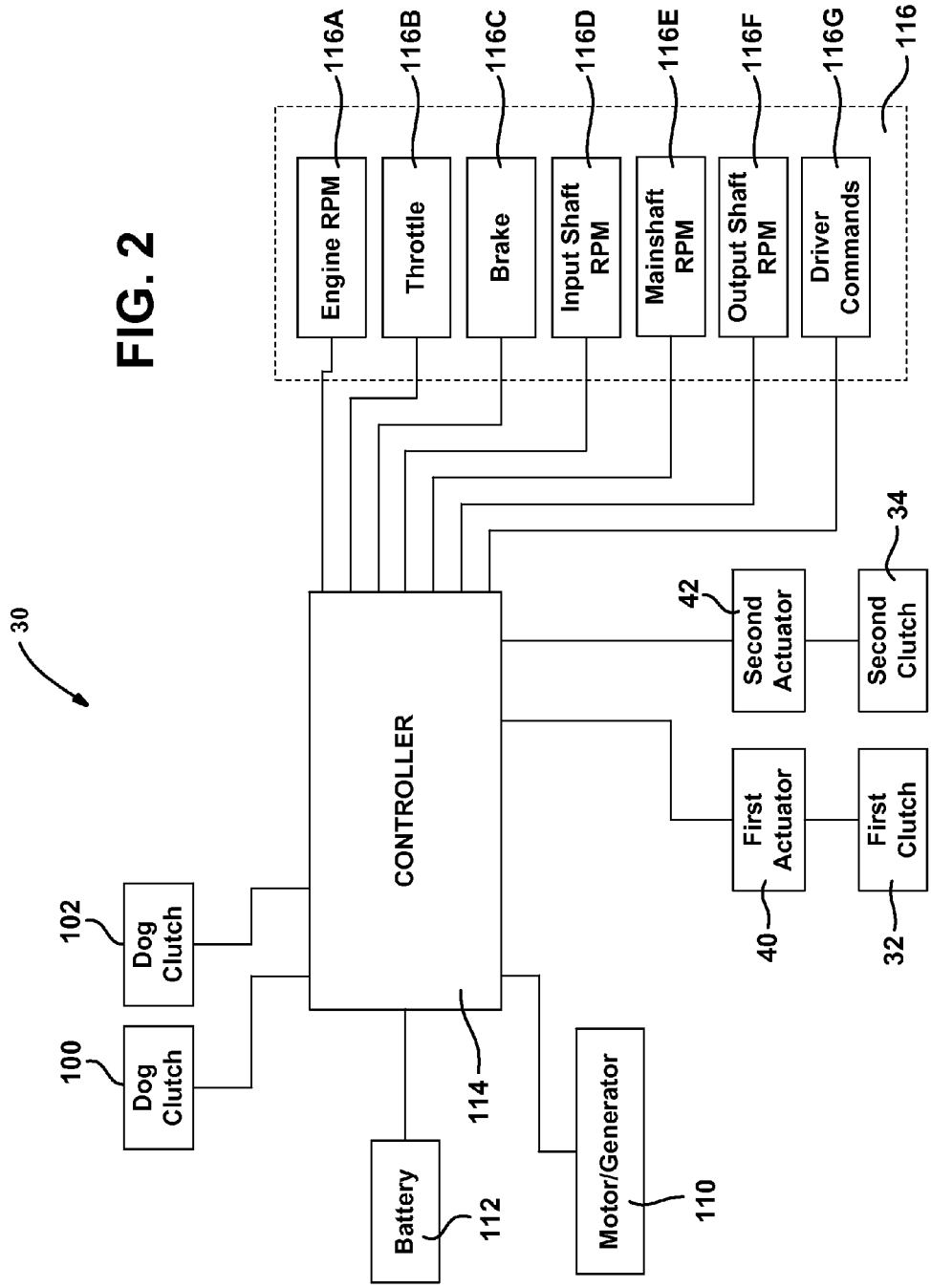
FIG. 2 is a diagram of the transmission control system adapted for use with the hybrid automated transmission shown in FIG. 1.

As shown in FIGS. 1 and 2, shift control system 30 includes a plurality of electrically-actuated dog clutches which are operable for selectively coupling a selected drive gear to output shaft 22 for establishing the six forward and two reverse speed ratio drive connections. These electrically-actuated dog clutches include a first dog clutch 100 operable for selectively coupling/releasing first drive gear 66 and third drive gear 78 to/from output shaft 22. A second dog clutch 102 is operable for selectively coupling/releasing second drive gear 72 and reverse drive gear 84 to/from output shaft 22. Each dog clutch includes a sliding sleeve (denoted by the suffix "A") which is splined for rotation with and axial movement on a clutch hub (denoted by the suffix "B") which, in turn, is fixed to output shaft 22. As is conventional, bi-directional axial movement of the sliding sleeve from the neutral, central uncoupled position shown results in clutch engagement with the adjacent drive gear. Preferably, each dog clutch is of the electromagnetic type having a pair of coils positioned proximate each end of each sliding sleeve. Electrical power delivered to the coils causes controlled axial movement of the sliding sleeves. It is to be understood that any other type of power-operated device capable of moving each sliding sleeve between its uncoupled and coupled positions is within the scope of this disclosure. Furthermore, it is contemplated that synchronizers may replace the dog clutches previously described.

Shift control system 30 further includes a first motor/generator 110 operably connected to ring gear 60 of second planetary gearset 26, a battery 112, a transmission controller 114, and vehicle sensors 116. First motor/generator 110 includes a fixed stator 110A and a rotor 110B that is fixed for rotation with ring gear 60. Controller 114 is an electronically-controlled unit capable of receiving data from vehicle sensors 116 and generating electric output signals in response to the sensor signals. Vehicle sensors 116 include engine speed 116A, throttle position 116B, brake status 116C, input shaft speed 116D, mainshaft speed 116E, output shaft speed 116F and driver commands 116G.

Controller 114 functions to control shifting of motor/generator 110 between an "engine starting" mode, "drive" mode, a "regeneration" mode, a "battery charging" mode and a "no-load" mode. In the drive mode, motor/generator 110 functions as an electric motor and is driven by electric power. In the regeneration mode, electric motor/generator 110 functions as a vehicle brake, resisting rotation of output shaft 22 when electric motor/generator 110 operates as a generator. During this mode of operation, kinetic energy from the vehicle is converted into electrical energy which is stored within battery 112. In the no-load mode, rotor 110B of motor/generator 110 is permitted to rotate freely. Controller 114 is also operable to coordinate and monitor the situation of all the electrically controlled devices associated with transmission 10 including first actuator 40, second actuator 42, first dog clutch 100 and second dog clutch 102 to permit power shifted sequential gear changes automatically without input from the vehicle operator.

In the engine starting mode, torque is delivered from electric motor/generator 110 through countershaft 20 and input gearset 17 to rotate a crankshaft (not shown) of engine 12 to aid in starting the engine. Furthermore, electric motor/generator 110 may operate as a parking brake to resist movement of the vehicle relative to the ground.

When it is desired to operate the vehicle, engine 12 is started with the gear shift lever in its PARK position. At this time, first clutch 32 and second clutch 34 are in their released positions such that drive torque is not transferred to mainshaft 18. Furthermore, electric motor/generator 110 is placed in its no-load mode thereby allowing rotor 110B to rotate freely and not transfer torque from engine 12 to output shaft 22. When the vehicle operator moves the gearshift lever from the PARK position to the DRIVE position, the vehicle may be launched using a number of different methods. In one launch method, controller 114 causes shift sleeve 100A to be axially displaced toward first drive gear 66 to drivingly interconnect first drive gear 66 and output shaft 22. Motor/generator 110 is operated in the drive mode to provide output torque to output shaft 22. Once the vehicle is moving, first clutch 32 of wet double clutch 14 is engaged by first actuator 40. Once first clutch 32 brakes ring gear 36, drive torque is transferred through mainshaft 18 and first output gearset 62 to output shaft 22. While first clutch 32 is being engaged, electric motor/generator 110 is gradually being controlled to reduce its output. When first clutch 32 is fully engaged, electric motor/generator operates in the no-load mode. It should be appreciated that transmission 10 is operable to initiate a launch with electric motor/generator 110 and subsequently transfer torque through any one of the six forward or two reverse final drive ratios depending on the data provided by vehicle sensors 116. Specifically, transmission 10 need not start in the lowest gear available but may be controlled to operate in the most appropriate drive ratio as determined by controller 114.

In an alternate launch where the vehicle operator requests maximum power, first clutch 32 is immediately engaged to transfer torque from engine 12 to output shaft 22. Electric motor/generator 110 is operated at the same time to maximize the torque provided to output shaft 22. This alternate launch method may not be as smooth as a launch provided solely by electric motor/generator 110. Accordingly, it is contemplated that a launch using wet double clutch 14 be reserved for instances where maximum acceleration is requested.

At any time the vehicle is being powered by engine 12, electric motor/generator 110 may be operated in the battery charging mode to charge battery 112 if the need arises. Vehicle regenerative brake need not occur to charge battery 112.

Yet another mode of operation of electric motor/generator 110 is during a gear shift. When controller 114 determines that a shift should occur from a first forward drive ratio to a second forward drive ratio, electric motor/generator 110 is powered to provide output torque through second planetary gearset 26 to output shaft 22. At this time, any one of a one-two shift, a three-five shift, a four-six shift or a R1-R2 shift may occur by disengaging first clutch 32 and engaging second clutch 34. The shift sequence previously described may be characterized as a power shift because electric motor/generator 110 continues to provide output torque to output shaft 22 while first clutch 32 is disengaged and second clutch 34 is engaged. A smooth torque transition results. To further reduce any undesirable lurches or bumps in torque transfer, first actuator 40 is controlled to slowly disengage first clutch 32 while second actuator 42 is controlled to slowly engage second clutch 34. Some overlap in time may occur when both clutches 32, 34 are transferring some quantity of torque at the same time.

An alternate method of obtaining the previously listed gear shifts includes simply disengaging first clutch 32 and engaging second clutch 34 without the assistance of electric motor/generator 110. As previously mentioned, it is contemplated that the latter method of gear shifting be limited to situations where maximum torque output is required and a relatively harsh shift may be tolerated.

For all other shifts such as a two-three shift, electric motor/generator 110 is controlled to gradually increase its output torque as one of first clutch 32 and second clutch 34 are being disengaged. For a relatively short period of time, the vehicle is powered by electric motor/generator and engine 12 via torque being provided through input gearset 17 and countershaft 20. While first clutch 32 and second clutch 34 are disengaged, controller 114 causes one of first dog clutch 100 and second dog clutch 102 to engage an appropriate drive gear. Once one of the drive gears is drivingly coupled to output shaft 22, electric motor/generator 110 is gradually depowered while one of first clutch 32 and second clutch 34 is gradually engaged. A smooth torque transition and gear change results. In the exemplary embodiment shown in FIG. 1, a first drive ratio is provided when first clutch 32 is engaged and first dog clutch 100 couples first drive gear 66 and output shaft 22. A second drive ratio is provided by disengaging first clutch 32 and engaging second clutch 34 while the previous position of first dog clutch 100 is maintained. A third drive ratio is provided when first clutch 32 is engaged, second clutch 34 is disengaged and second dog clutch 102 drivingly couples second drive gear 72 and output shaft 22. A fourth drive ratio exists when first clutch 32 is engaged and first dog clutch 100 drivingly interconnects third drive gear 78 and output shaft 22. A fifth drive ratio is provided by engaging second clutch 34 and drivingly interconnecting second drive gear 72 with output shaft 22. The sixth and final forward drive ratio is arranged when second clutch 34 is engaged and first dog clutch 100 drivingly couples third drive gear 78 and output shaft 22. A first reverse gear is provided by engaging first clutch 32 and causing second dog clutch 102 to drivingly couple reverse drive gear 84 with output shaft 22. A second reverse is provided by maintaining the position of second dog clutch 102, disengaging first clutch 32 and engaging second clutch 34.

One skilled in the art will appreciate that one advantage of the transmission previously described relates to the vehicle being powered by internal combustion engine 12 as well as electric motor/generator 110. The power split configuration allows for a smaller motor and battery to be utilized compared to previously known hybrid drive systems.

Figure 3:
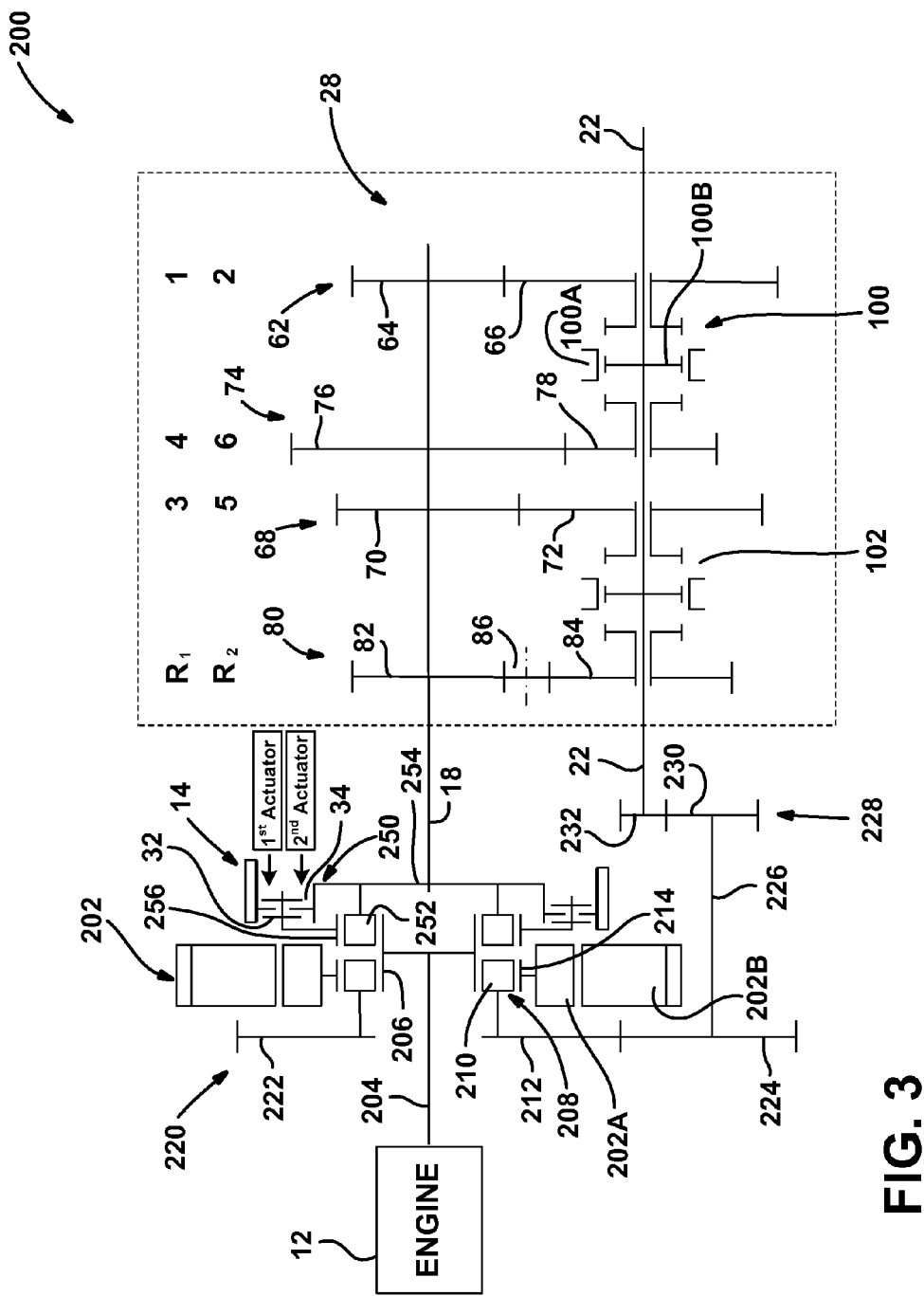
FIG. 3 is a schematic view of an alternate embodiment hybrid automated transmission.

FIG. 3 depicts an alternate embodiment transmission 200. Transmission 200 is substantially similar to transmission 10 except that an electric motor/generator 202 having a relatively larger diameter than electric motor/generator 110 is used. Output gearsets 28 and wet double clutch 14 are implemented within transmission 200. Accordingly, like elements will retain their previously introduced reference numerals. As shown in FIG. 2, engine 12 is drivingly coupled to an input shaft 204 having a sun gear 206 fixed thereto. A first planetary gearset 208 includes sun gear 206, a plurality of pinion gears 210 rotatably supported on a carrier 212 and a ring gear 214. Ring gear 214 is fixed to a rotor 202A of electric motor/generator 202. Electric motor/generator 202 also includes a stator 202B. An input gearset 220 includes a first input gear 222 in driving engagement with a first transfer gear 224 fixed to a countershaft 226. First input gear 222 is fixed to carrier 212. Countershaft 226 is in driving engagement with output shaft 22 via a head set 228. Head set 228 includes a second transfer gear 230 fixed to countershaft 226 in meshing engagement with a third transfer gear 232 fixed to output shaft 22.

A second planetary gearset 250 includes sun gear 206, a plurality of pinion gears 252 rotatably supported on a carrier 254 and a ring gear 256. As previously described in relation to transmission 10, first clutch 32 is operable to selectively brake ring gear 256. Second clutch 34 is selectively operable to drivingly interconnect ring gear 256 and carrier 254. Carrier 254 is fixed to mainshaft 18.

Transmission 200 is configured to provide six forward drive ratios and two reverse drive ratios. These combinations are achieved through the use of two planetary gearsets, twelve gears, one double clutch and two dog clutches. Due to the increased outer diameter of electric motor/generator 202, a greater maximum torque may be provided compared to electric motor/generator 110.

Figure 4:
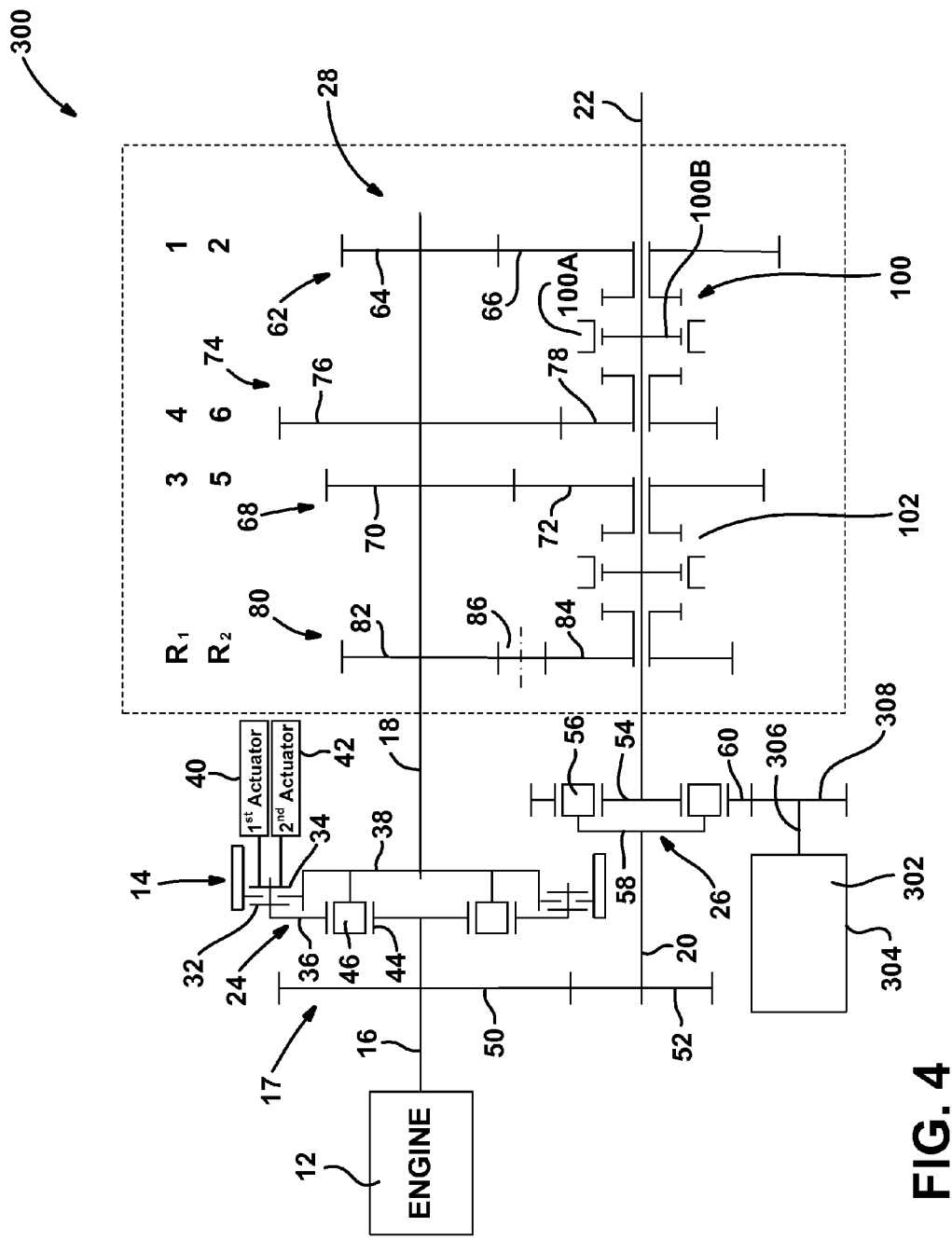
FIG. 4 is a schematic view of another alternate embodiment hybrid automated transmission.

FIG. 4 depicts another alternate embodiment transmission 300. Transmission 300 is substantially similar to transmission 10. Accordingly, like element will retain their previously introduced reference numerals. Transmission 300 includes an electric motor/generator 302 presented in a more standard package including a cylindrical housing 304 and an output shaft 306 extending from one end of housing 304. A pinion gear 308 is fixed to output shaft 306 and drivingly engaged with ring gear 60 of second planetary gearset 26. The remaining components of transmission 300 are identical to those previously described in relation to transmission 10. Electric motor/generator 302 may be externally mounted to a housing (not shown) of transmission 300 to alleviate packaging concerns, if required. Alternatively, electric motor/generator 302 may be packaged within a common housing along with the clutches and gears previously described.

Figure 5:
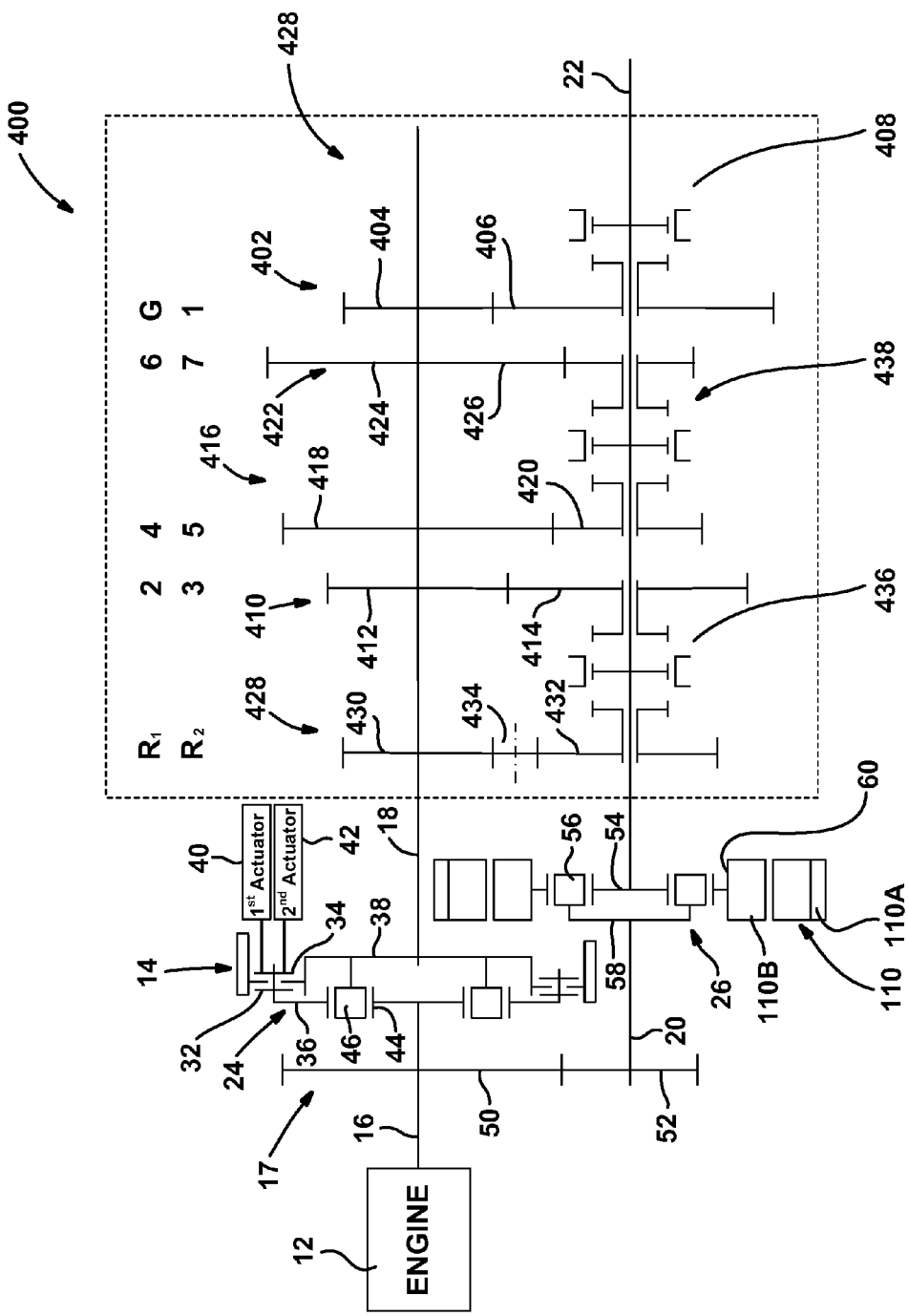
FIG. 5 is a schematic view of another alternate embodiment hybrid automated transmission.

FIG. 5 depicts another alternate embodiment transmission 400 illustrating the ease of modifying the basic transmission design provided by transmission 10. Transmission 400 is substantially similar to transmission 10 except that a fifth set of output gears have been added to provide two additional forward speeds. Because only the output gearsets 28 have been modified, the similar components of transmission 10 will retain their previously introduced reference numerals.

Transmission 400 includes a first output gearset 402 having a first speed gear 404 fixed to mainshaft 18 and in meshing engagement with a first drive gear 406 rotatably supported on output shaft 22. A first dog clutch 408 is selectively operable to drivingly couple first drive gear 406 to output shaft 22. A second output gearset 410 includes a second speed gear 412 fixed to mainshaft 18 and drivingly engaged with a second drive gear 414 rotatably supported on output shaft 22. A third output gearset 416 includes a third speed gear 418 fixed to mainshaft 18 and in meshing engagement with a third drive gear 420 rotatably supported by output shaft 22. A fourth output gearset 422 includes a fourth speed gear 424 fixed to mainshaft 18 and in meshing engagement with a fourth drive gear 426 rotatably supported by output shaft 22. A fifth output gearset 428 includes a reverse speed gear 430 fixed to mainshaft 18, a reverse drive gear 432 rotatably supported by output shaft 22 and a reverse idler gear 434 meshingly engaged with reverse speed gear 430 and reverse drive gear 432. A second dog clutch 436 is selectively operable to drivingly connect reverse drive gear 432 and output shaft 22 or second drive gear 414 and output shaft 22. A third dog clutch 438 is selectively operable to drivingly interconnect third drive gear 420 and output shaft 22 or fourth drive gear 426 and output shaft 22. In the arrangement shown, a G-1 shift, a 2-3 shift, a 4-5 shift, a 6-7 shift and/or an R1-R2 shift may be accomplished by disengaging first clutch 32 and engaging second clutch 34 without changing the engagement condition of any of the dog clutches. Electric motor/generator 110 may or may not be used to assist in these shifts as described in relation to the shift from a first drive ratio to a second drive ratio within transmission 10. The remaining gear shifts are accomplished by transferring power through input gearset 17 and electric motor/generator 110 while a dog clutch disengagement/engagement occurs as previously described. Upon comparing the output gearset arrangements of transmission 400 and transmission 10, it should be appreciated that any number of gear ratios may be provided and that individual output gearsets may be configured to allow faster, smoother shifts between certain drive ratios as desired.

Figure 6:
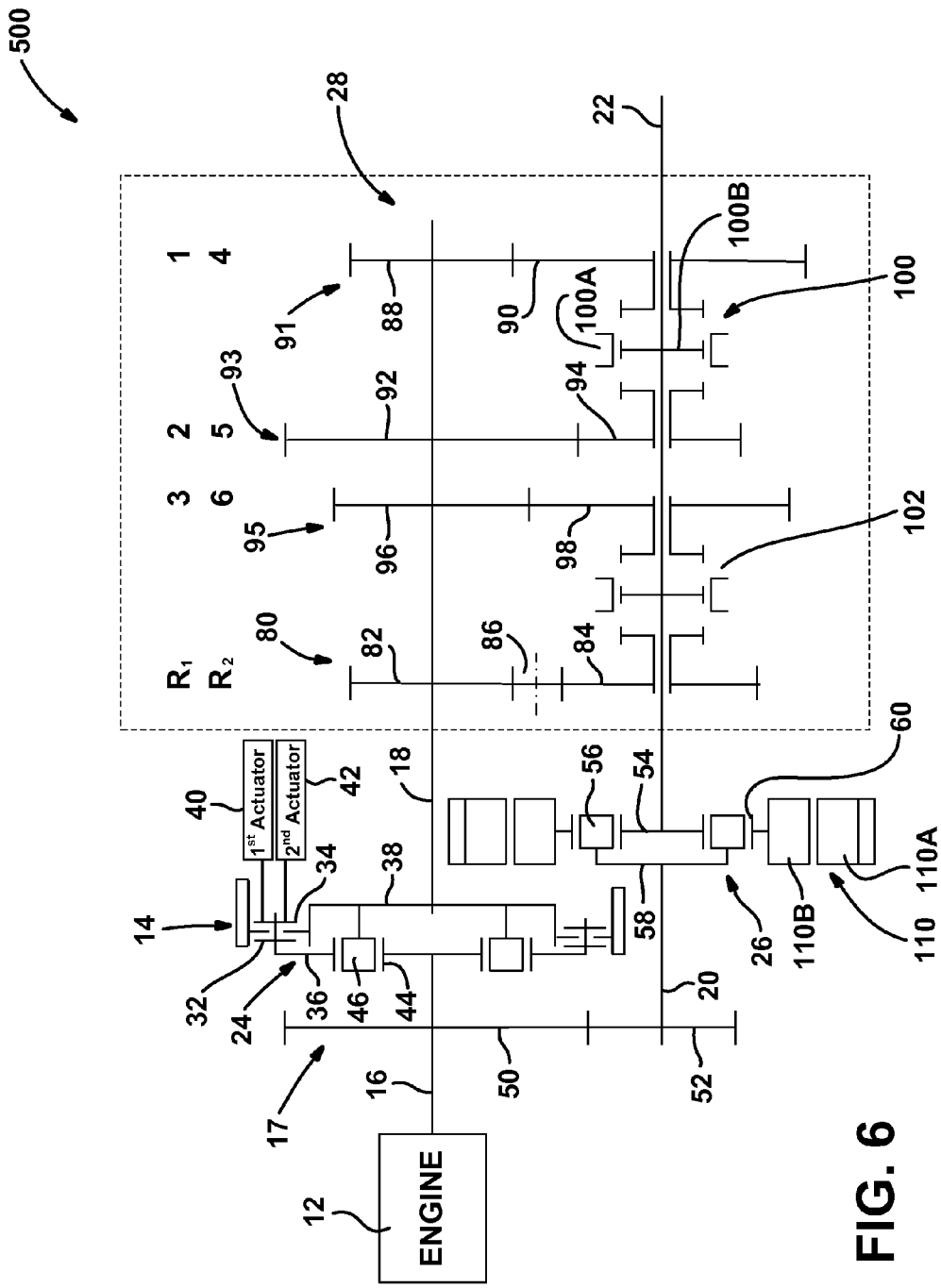
FIG. 6 is a schematic view of another alternate embodiment hybrid automated transmission.

FIG. 6 depicts another embodiment transmission 500 illustrating the ease of modifying the basic transmission design provided by transmission 10. Transmission 500 is substantially similar to transmission 10 except that three output gearsets (91, 93, 95) are re-arranged. A first output gearset 91 includes a first speed gear 88 which is meshed with a first drive gear 90. A second output gearset 93 includes a second speed gear 92 which is meshed with a second drive gear 94. A third output gearset 95 includes a third speed gear 96 which is meshed with a third drive gear 98.

First output gearset 91 is arranged to provide a first drive ratio when first clutch 32 of double clutch 14 is engaged. First output gearset 91 also transfers torque to provide a fourth drive ratio when second clutch 34 transfers torque and first clutch 32 does not. Similarly, second output gearset 93 may provide a second and fifth drive ratio depending on the actuation state of first clutch 32 and second clutch 34. The third output gearset 95 is arranged to provide third and sixth forward drive ratios.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A transmission for use in a motor vehicle having an engine and a driveline, the transmission comprising:
    an input shaft driven by the engine;
    an output shaft adapted for connection to the driveline;
    a mainshaft;
    a first planetary gearset having a first input member driven by the input shaft, a first output member driving the mainshaft, and a first reaction member;
    a motor/generator;
    a second planetary gearset having a second input member, a second output member fixed to the output shaft and a ring gear operable to drive or be driven by the motor/generator, a rotor of the motor/generator circumscribing and being fixed to the ring gear.

2. The transmission of claim 1 wherein the rotor rotates about a common axis with the input shaft.

3. The transmission of claim 1 wherein the rotor rotates about a common axis with the output shaft.

4. The transmission of claim 1 wherein each of the first and second planetary gearsets includes a common sun gear.

5. The transmission of claim 1 further including a first clutch operable for releasably braking the first reaction member and a second clutch operable for releasably coupling the first reaction member and the first output member to establish a drive connection between the first reaction member and the first output member.

6. The transmission of claim 5 further including an input gearset having an input gear fixed to the input shaft and an input drive gear fixed to a countershaft, the countershaft providing an input to the output shaft.

7. The transmission of claim 5 further including a first speed gear fixed to the mainshaft in meshed engagement with a first drive gear rotatably supported on the output shaft and a second speed gear fixed to the mainshaft in meshing engagement with a second drive gear rotatably supported by the output shaft.

8. The transmission of claim 7 further including a shift clutch operable to releasably couple one of the first and second drive gears to the output shaft to establish a drive connection between one of the first and second drive gears and the output shaft.

9. A transmission for use in a motor vehicle having an engine and a driveline, the transmission comprising:
   an input shaft driven by the engine;
   an output shaft adapted for connection to the driveline;
   a mainshaft;
   a first planetary gearset having a first input member driven by the input shaft, a first output member driving the mainshaft, and a first reaction member;
   a motor/generator;
   a second planetary gearset having a second input member driven by the input shaft, a second output member driving the output shaft and a reaction member operable to drive or be driven by the motor/generator;
   a first clutch operable for releasably braking the first reaction member; and
   a second clutch operable for releasably coupling the first reaction member and the first output member to establish a drive connection between the first reaction member and the first output member.

10. The transmission of claim 9 further including a first speed gear fixed to the mainshaft in meshed engagement with a first drive gear rotatably supported on the output shaft and a second speed gear fixed to the mainshaft in meshing engagement with a second drive gear rotatably supported by the output shaft.

11. The transmission of claim 10 further including a shift clutch operable to releasably couple one of the first and second drive gears to the output shaft to establish a drive connection between one of the first and second drive gears and the output shaft.

12. The transmission of claim 9 wherein the motor/generator is operable to solely provide output torque to the output shaft without contribution from the engine.

13. A transmission for use in a motor vehicle having an engine and a driveline, the transmission comprising:
   an input shaft driven by the engine;
   an output shaft adapted for connection to the driveline;
   an input gearset driven by the input shaft and driving a countershaft;
   a mainshaft;
   a first planetary gearset having a first input member driven by the input shaft, a first output member driving the mainshaft, and a first reaction member;
   a motor/generator;
   a second planetary gearset having a second input member driven by the countershaft, a second output member driving the output shaft and a reaction member operable to drive or be driven by the motor/generator;
   a plurality of output gearsets, each output gearset including a speed gear fixed to the mainshaft and a drive gear rotatably supported on the output shaft;
   a first clutch operable for releasably braking the first reaction member;
   a second clutch operable for releasably coupling the first reaction member and the first output member to establish a drive connection between the first reaction member and the first output member; and
   a shift clutch operable to releasably couple one of the driven gears of the output gearsets to the output shaft to establish a drive connection between one of the driven gears of the output gearset and the output shaft.

14. The transmission of claim 13 further including a controller for controlling actuation of the first and second clutches.

15. The transmission of claim 14 further including a first electric actuator for controlling the first clutch and a second electric actuator for controlling the second clutch, the controller controlling the first and second actuators.

16. The transmission of claim 15 wherein the shift clutch is an electrically actuated dog clutch controlled by the controller.

17. The transmission of claim 13 wherein the first and second clutches are portions of a single wet double clutch.

18. The transmission of claim 13 wherein the plurality of output gearsets includes four gearsets arranged to define six forward speed ratios and two reverse speed ratios.

19. The transmission of claim 13 wherein the first input member is a sun gear, the first output member is a carrier and the first reaction member is a ring gear.

20. The transmission of claim 19 wherein the second input member is a carrier, the second output member is a sun gear and the second reaction member is a ring gear.

* * * * *